US008600024B2

(12) United States Patent
Lund

(10) Patent No.: US 8,600,024 B2
(45) Date of Patent: *Dec. 3, 2013

(54) METHOD AND SYSTEM FOR PROVIDING TO A SECOND PARTY, COMPUTER-NETWORK RELATED INFORMATION ABOUT A FIRST PARTY

(75) Inventor: Arnold M. Lund, Sleepy Hollow, IL (US)

(73) Assignee: Rakuten, Inc., Shinagawa-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,188

(22) Filed: Mar. 29, 2012

(65) Prior Publication Data

US 2012/0195306 A1    Aug. 2, 2012

Related U.S. Application Data

(63) Continuation of application No. 13/161,699, filed on Jun. 16, 2011, which is a continuation of application No. 12/140,767, filed on Jun. 17, 2008, now Pat. No. 7,974,397, which is a continuation of application No. 10/405,941, filed on Apr. 1, 2003, now Pat. No. 7,403,947, which is a continuation of application No. 09/480,416, filed on Jan. 11, 2000, now abandoned, which is a continuation of application No. 09/256,985, filed on Feb. 24, 1999, now Pat. No. 6,067,546, which is a continuation of application No. 08/801,880, filed on Feb. 18, 1997, now Pat. No. 5,946,684.

(51) Int. Cl.
H04M 3/42    (2006.01)

(52) U.S. Cl.
USPC ............ 379/201.01; 379/201.02; 379/201.03; 379/201.04; 379/211.01; 379/211.02; 379/207.02; 379/219; 379/142.01; 709/201

(58) Field of Classification Search
USPC ............ 379/201.01, 201.02, 201.03, 201.04, 379/211.01, 211.02, 207.02, 219, 142.01; 709/201
See application file for complete search history.

(56) References Cited

U.S. PATENT DOCUMENTS 4,776,005 A    10/1988    Petriccione et al.
5,054,055 A    10/1991    Hanle et al.
(Continued)

FOREIGN PATENT DOCUMENTS

WO    9722212 A1    6/1997

OTHER PUBLICATIONS

John Quarterman et al., "Notable Computer Networks," Communications of the ACM, Oct. 1986, pp. 932-970, vol. 20, No. 10, ACM, New York, USA.

(Continued)

*Primary Examiner* — Quynh Nguyen
(74) *Attorney, Agent, or Firm* — Dennis M. Hubbs

(57) ABSTRACT

A method and system for providing computer-network related information about a second party. First, the second party receives a telephone number of a first party. The second party's customer premises equipment (CPE) or elements in a telephone network then use the telephone number to index a database, which contains combinations of telephone numbers and computer-network addresses. Once the first party's computer-network address is retrieved, first-party-customized information present at the computer-network location specified by the computer-network address can be sent to and displayed on the second party's CPE. Also, the first party's telephone number can be sent to an application in the computer network, causing the first-party-customized information to be automatically displayed on the second party's CPE.

20 Claims, 6 Drawing Sheets

(56) References Cited

U.S. PATENT DOCUMENTS

| | | |
|---|---|---|
| 5,220,599 A | 6/1993 | Sasano et al. |
| 5,239,577 A | 8/1993 | Bates et al. |
| 5,317,630 A | 5/1994 | Feinberg et al. |
| 5,349,638 A | 9/1994 | Pitroda et al. |
| 5,425,090 A | 6/1995 | Orriss |
| 5,430,719 A | 7/1995 | Weisser, Jr. |
| 5,438,568 A | 8/1995 | Weisser, Jr. |
| 5,467,385 A | 11/1995 | Reuben et al. |
| 5,479,495 A | 12/1995 | Blumhardt |
| 5,481,603 A | 1/1996 | Gutierrez et al. |
| 5,499,290 A | 3/1996 | Koster |
| 5,511,109 A | 4/1996 | Hartley et al. |
| 5,517,562 A | 5/1996 | McConnell |
| 5,519,772 A | 5/1996 | Akman et al. |
| 5,526,413 A | 6/1996 | Cheston, III et al. |
| 5,546,447 A | 8/1996 | Skarbo et al. |
| 5,566,235 A | 10/1996 | Hetz |
| 5,572,583 A | 11/1996 | Wheeler, Jr. et al. |
| 5,633,922 A | 5/1997 | August et al. |
| 5,644,619 A | 7/1997 | Farris et al. |
| 5,657,383 A | 8/1997 | Gerber et al. |
| 5,687,212 A | 11/1997 | Kinser, Jr. et al. |
| 5,708,780 A | 1/1998 | Levergood et al. |
| 5,712,979 A | 1/1998 | Graber et al. |
| 5,742,763 A | 4/1998 | Jones |
| 5,751,707 A | 5/1998 | Voit et al. |
| 5,754,636 A | 5/1998 | Bayless et al. |
| 5,768,513 A | 6/1998 | Kuthyar et al. |
| 5,778,367 A | 7/1998 | Wesinger, Jr. et al. |
| 5,805,682 A | 9/1998 | Voit et al. |
| 5,812,776 A * | 9/1998 | Gifford .................... 709/217 |
| 5,825,862 A | 10/1998 | Voit et al. |
| 5,838,682 A | 11/1998 | Dekelbaum et al. |
| 5,867,494 A | 2/1999 | Krishnaswamy et al. |
| 5,867,495 A | 2/1999 | Elliott et al. |
| 5,884,032 A * | 3/1999 | Bateman et al. .............. 709/204 |
| 5,884,262 A | 3/1999 | Wise et al. |
| 5,943,399 A | 8/1999 | Bannister et al. |
| 5,946,684 A | 8/1999 | Lund |
| 5,974,128 A | 10/1999 | Urban et al. |
| 5,978,806 A | 11/1999 | Lund |
| 5,982,867 A | 11/1999 | Urban et al. |
| 6,009,469 A | 12/1999 | Mattaway et al. |
| 6,031,836 A | 2/2000 | Haserodt |
| 6,067,546 A | 5/2000 | Lund |
| 6,076,093 A | 6/2000 | Pickering |
| 6,078,579 A | 6/2000 | Weingarten |
| 6,104,789 A | 8/2000 | Lund |
| 6,115,384 A | 9/2000 | Parzych |
| 6,125,113 A | 9/2000 | Farris et al. |
| 6,240,444 B1 | 5/2001 | Fin et al. |
| 6,282,281 B1 | 8/2001 | Low |
| 6,385,191 B1 | 5/2002 | Coffman et al. |
| 6,442,263 B1 | 8/2002 | Beaton et al. |
| 6,658,100 B1 | 12/2003 | Lund |
| 6,891,939 B1 | 5/2005 | Urban et al. |
| 7,062,029 B2 | 6/2006 | Lund |
| 7,792,261 B2 | 9/2010 | Lund |
| 8,422,653 B2 | 4/2013 | Lund |
| 8,447,022 B2 | 5/2013 | Lund |

OTHER PUBLICATIONS

European Search Report dated Apr. 27, 2005 for Application No. EP 98932913.

* cited by examiner

METHOD AND SYSTEM FOR PROVIDING TO A SECOND PARTY, COMPUTER-NETWORK RELATED INFORMATION ABOUT A FIRST PARTY

CROSS-REFERENCE TO RELATED APPLICATIONS

The present U.S. Utility patent application claims priority pursuant to 35 U.S.C. §120, as a continuation, to the following U.S. Utility patent applications which are hereby incorporated herein by reference in its entirety and made part of the present U.S. Utility patent application for all purposes:

1. U.S. Utility application Ser. No. 13/161,699, entitled "METHOD AND SYSTEM FOR PROVIDING COMPUTER-NETWORK RELATED INFORMATION ABOUT A CALLING PARTY," filed Jun. 16, 2011, pending, which claims priority pursuant to 35 U.S.C. §120, as a continuation, to the following U.S. Utility application which is hereby incorporated herein by reference in its entirety and made part of the present U.S. Utility application for all purposes:
2. U.S. Utility application Ser. No. 12/140,767, entitled "METHOD AND SYSTEM FOR PROVIDING COMPUTER-NETWORK RELATED INFORMATION ABOUT A CALLING PARTY," filed Jun. 17, 2008, which issued as U.S. Pat. No. 7,974,397 on Jul. 5, 2011, which claims priority pursuant to 35 U.S.C. §120, as a continuation, to the following U.S. Utility application which is hereby incorporated herein by reference in its entirety and made part of the present U.S. Utility application for all purposes:
3. U.S. Utility application Ser. No. 10/405,941, entitled "METHOD AND SYSTEM FOR PROVIDING COMPUTER-NETWORK RELATED INFORMATION ABOUT A CALLING PARTY," filed Apr. 1, 2003, which issued as U.S. Pat. No. 7,403,947 on Jul. 22, 2008, which claims priority pursuant to 35 U.S.C. §120, as a continuation, to the following U.S. Utility application which is hereby incorporated herein by reference in its entirety and made part of the present U.S. Utility application for all purposes:
4. U.S. Utility application Ser. No. 09/480,416, entitled "METHOD AND SYSTEM FOR PROVIDING COMPUTER-NETWORK RELATED INFORMATION ABOUT A CALLING PARTY," filed Jan. 11, 2000, abandoned, which claims priority pursuant to 35 U.S.C. §120, as a continuation, to the following U.S. Utility application which is hereby incorporated herein by reference in its entirety and made part of the present U.S. Utility application for all purposes:
5. U.S. Utility application Ser. No. 09/256,985, entitled "METHOD AND SYSTEM FOR PROVIDING COMPUTER-NETWORK RELATED INFORMATION ABOUT A CALLING PARTY," filed Feb. 24, 1999, which issued as U.S. Pat. No. 6,067,546 on May 23, 2000, which claims priority pursuant to 35 U.S.C. §120, as a continuation, to the following U.S. Utility application which is hereby incorporated herein by reference in its entirety and made part of the present U.S. Utility Application for all purposes:
6. U.S. Utility application Ser. No. 08/801,880, entitled "METHOD AND SYSTEM FOR PROVIDING COMPUTER-NETWORK RELATED INFORMATION ABOUT A CALLING PARTY," filed Feb. 18, 1997, which issued as U.S. Pat. No. 5,946,684 on Aug. 31, 1999.

TECHNICAL FIELD

The present invention relates generally to telecommunication services using a public telephone system and more specifically to enhanced caller identification services.

BACKGROUND

Local telephone service providers, through a central office, offer a variety of optional services to their customers. Some of these services provide information about a person placing a call (a calling party) to a person receiving the call (a called party).

In order to provide these services, the central office ordinarily has access to a local database which has telephone-number fields correlated with data fields containing information such as the calling party's name. Prior to terminating a call to the called party, the central office searches the database for the telephone number of the calling party. If the telephone number is found within the database, the central office accesses the relevant information and delivers it to the called party.

Customer premises equipment (CPE) of many offices and homes integrates telephony and computers. This type of CPE connects to a network environment that includes both a real or virtual telephone path and a real or virtual data path for access to a computer network, such as the Internet.

There is an emerging technology that integrates both a computer and a telephone into a single device. One example of this is a smart or intelligent phone 100 (see FIG. 1), a phone which contains a built-in microprocessor that is capable of running applications such as Web browsing software. Another example is Internet television with integrated telephony.

There is a need to provide a caller identification service that takes advantage of CPE that integrates telephony and computers.

DETAILED DESCRIPTION OF THE DRAWINGS

Advantages

One advantage of the embodiments described below is that the called party receives a richer set of information about the calling party than with present caller identification services.

From the perspective of the calling party, these embodiments have the advantage of providing customized information to the called party even when the called party cannot or will not answer the phone.

These embodiments also make the general communication experience more enjoyable.

Before turning to the preferred embodiments, it is important to understand the telephone networks with which some of these embodiments operate—networks with and networks without central offices equipped with Advanced Intelligent Network (AIN) software.

Networks with Central Offices Equipped with AIN Software.

Figure 1:
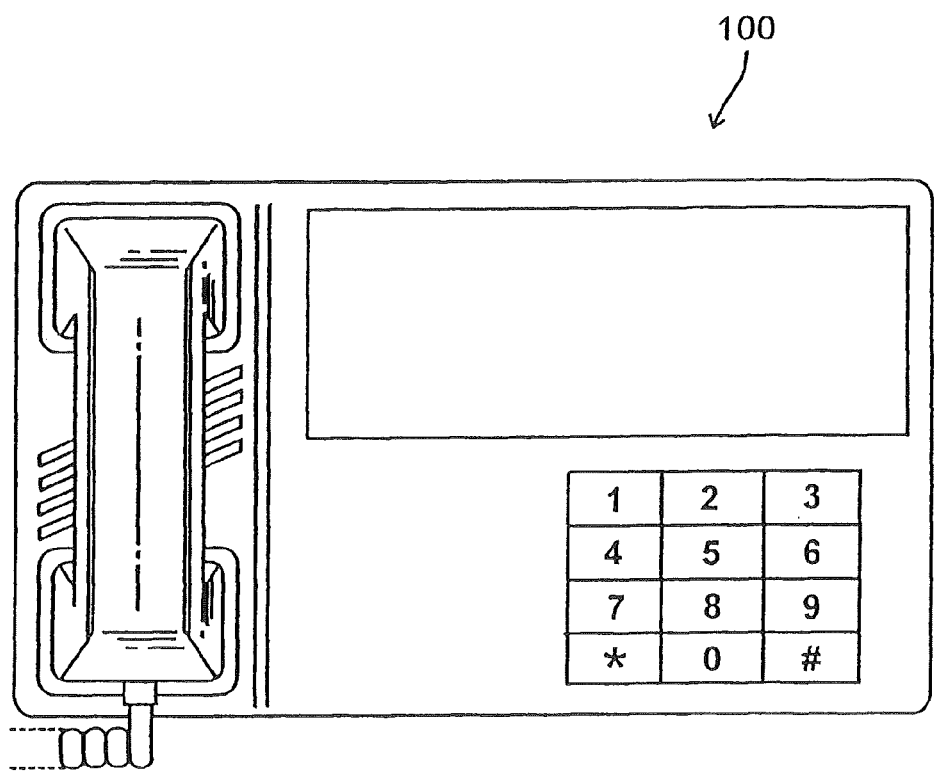
FIG. 1 is an illustration of a CPE of a preferred embodiment.
Figure 2:
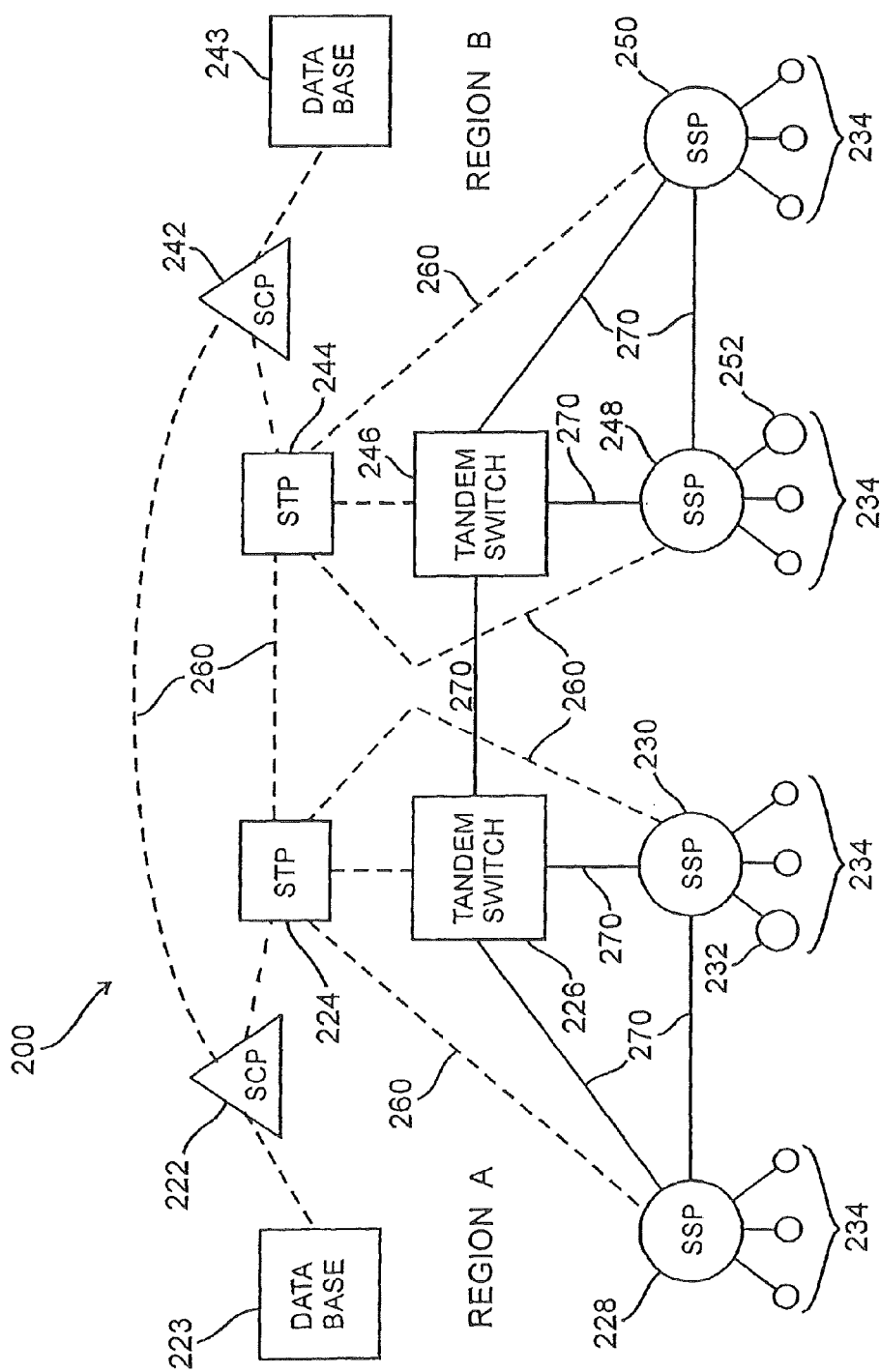
FIG. 2 is a block diagram of a telephone network of a preferred embodiment, the network having a central office equipped with Advanced Intelligent Network (AIN) software.

FIG. 2 shows a modern telephone network 200 divided into two regions (Region A and Region B), which may be used with the preferred embodiments described below. The network 200 contains elements that typically communicate network signaling protocols 260 and voice and data traffic 270 between one another. The illustrated elements include the following: customer premise equipment (CPE) 234; signal switching points (SSP) 228, 230, 248, 250; tandem switches 226, 246; signal transfer points (STP) 224, 244; service control points (SCP) 222, 242; and databases 223, 243.

CPE 234 gains access to the network 200 by communicating voice and data traffic 270 to the SSPs 228, 230, 248, 250. The CPE of the preferred embodiments has a real or virtual telephone line and a real or virtual data line.

An Advanced Intelligent Network (AIN) SSP is a central office equipped with AIN software. AIN software can enable a SSP to suspend call processing and launch a query to a SCP. A SSP is similar to a local telephone central office equipped with a voice switch such as a Lucent #5 ESS or a Nortel DMS-100, well known to those skilled in the art.

The SSPs 228, 230, 248, 250 communicate voice and data traffic to tandem switches 226, 246. Tandem switches 226, 246 transfer voice and data traffic 270 within or between regions of the network 200. Tandem switches such as Lucent #4 ESS and Nortel DMS-200 are well known in the art. It should be understood, however, that SSPs in different areas may also transfer voice and data traffic directly between each other without the use of a tandem switch.

Both the tandem switches 226, 246 and the SSPs 228, 230, 248, 250 transfer network signaling protocols 260 to the STPs 224, 244. The network signaling protocols 260, such as those defined by Signaling System 7, which is well known in the art, control the network switching of voice and data traffic.

STPs 224, 244 transfer network signaling protocols 260 within or between regions and to SCPs 222, 242. SCPs 222, 242 may also directly transfer network signaling protocols 260 between regions. The STPs 224, 244 and the SCPs 222, 242 preferably include a microprocessor controlled computer system using computer peripherals controlled by application software programmed to implement the appropriate communication functions. STPs and SCPs are available from a number of telephone switch venders.

SCPs 222, 242 handle the queries sent from a called party's 252 SSP 248 by communicating with databases 223, 243. These databases 223, 243 contain information identifying the types of services available to each CPE 234 and related information such as, but not limited to, FAX numbers, e-mail addresses, cellular numbers, and computer-network addresses, such as Internet location identifiers (e.g., Universal Resource Locators (URLs)). The information is stored in the form of a database or lookup table in a memory storage device such as random access memory or a magnetic or optical disk drive, known to those skilled in the art. Of course, a combination of different memory storage devices or other types of devices may be used. The memory storage device preferably stores the service information in a data record such as an array, lookup or pointer table, or other data structures known to those skilled in the art.

Networks without Central Offices Equipped with AIN Software

Figure 3:
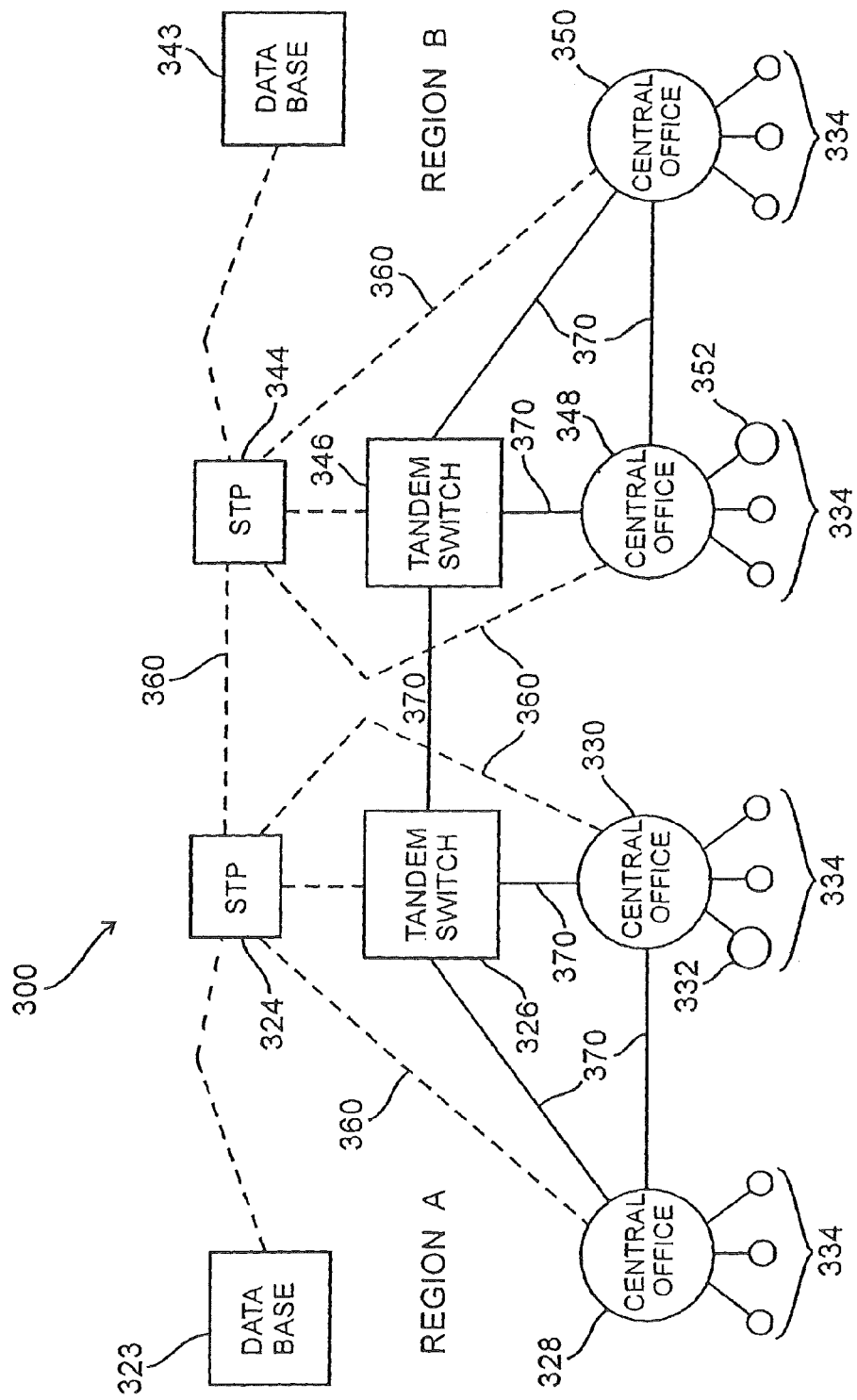
FIG. 3 is a block diagram of a telephone network of a preferred embodiment, the network having a central office that is not equipped with AIN software.

FIG. 3 shows a network 300 in which the central offices 328, 330, 348, 350 are equipped with standard switching equipment, which does not utilize AIN software. The network 300 contains elements that typically communicate network signaling protocols 360 and voice and data traffic 370 between one another. The elements in this network include the following: customer premise equipment (CPE) 334; central offices 328, 330, 348, 350; tandem switches 326, 346; signal transfer points (STP) 324, 344; and databases 323, 343.

This network 300 is similar in structure to the AIN network 200, discussed above, with some notable differences. In this network 300, the central offices 328, 330, 348, 350 are not equipped with AIN software. Also, STPs 324, 344, not SCPs, communicate with the databases 323, 343.

Figure 4:
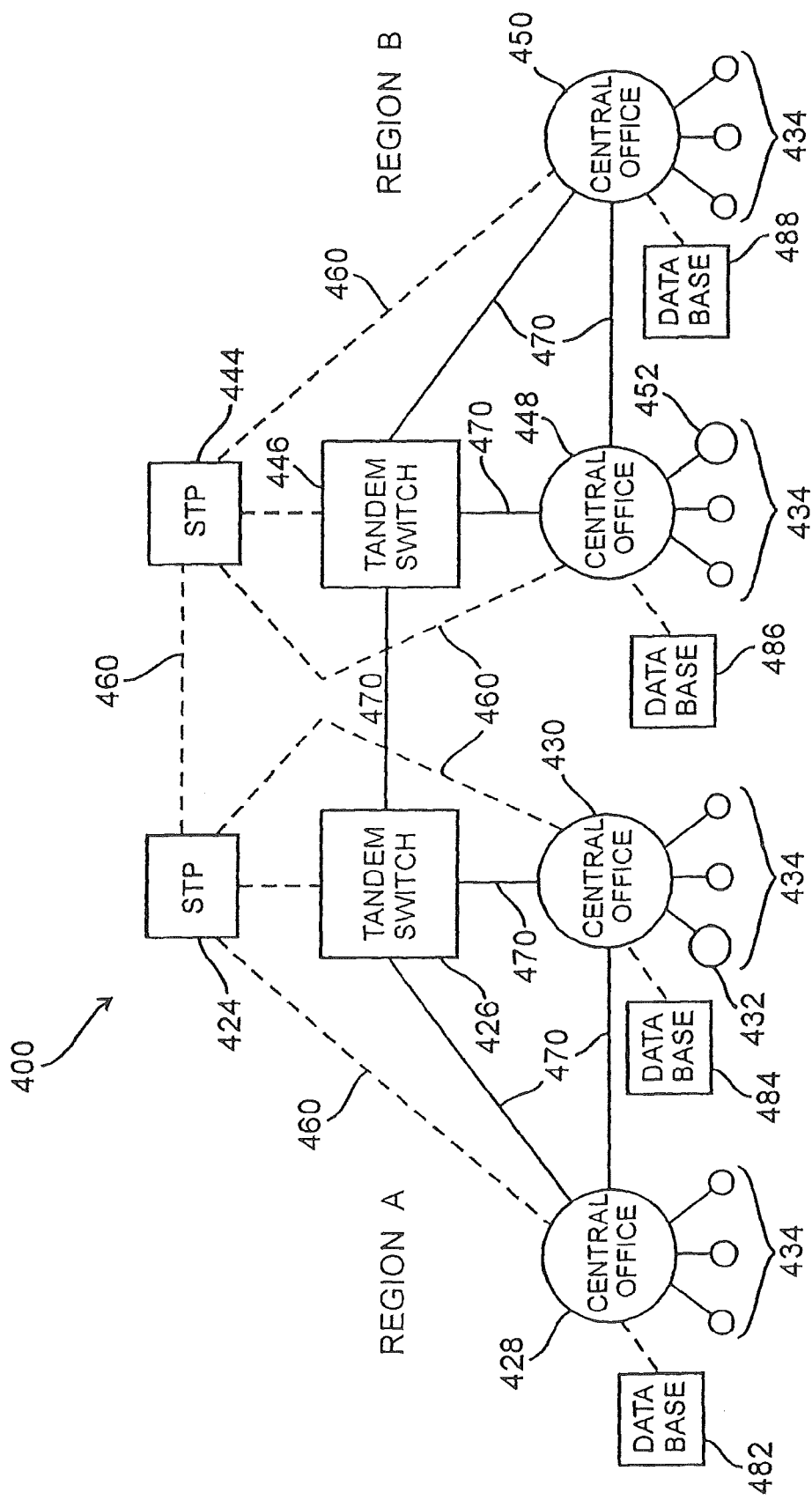
FIG. 4 is a block diagram of an alternative telephone network to the one shown in FIG. 3.

FIG. 4 shows an alternative network 400 to network 300. This network also contains elements that typically communicate network signaling protocols 460 and voice and data traffic 470 between one another. The elements in this network include the following: customer premise equipment (CPE) 434; central offices 428, 430, 448, 450; tandem switches 426, 446; signal transfer points (STP) 424, 444; and databases 482, 484, 486, 488. Unlike network 300, an intelligent peripheral, such as an AIN service node/intelligent peripheral, directly or indirectly attached to the central offices 428, 430, 448, 450 communicates with the databases 482, 484, 486, 488.

Figure 5:
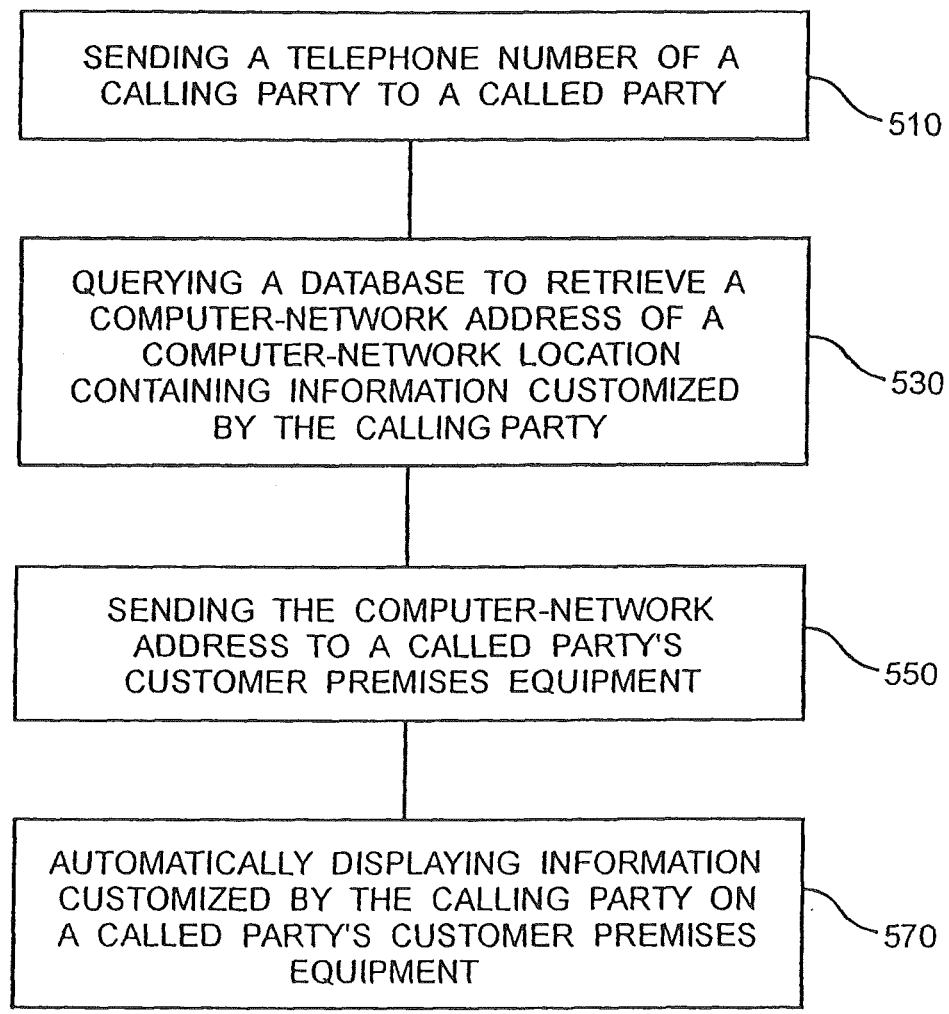
FIG. 5 is an illustration of a method of a preferred embodiment.
Figure 6:
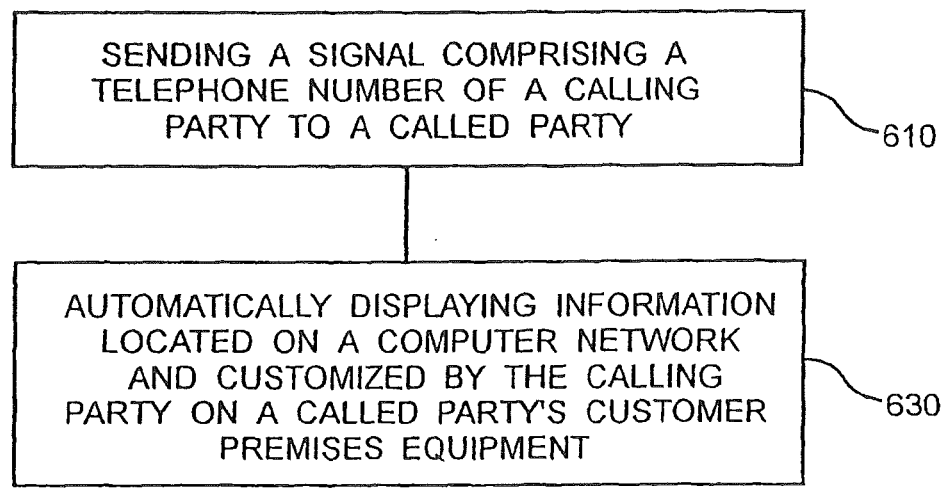
FIG. 6 is an illustration of a method of another preferred embodiment.

The above-described networks may be used in a method and system for providing network related information to a called party. The method of one set of preferred embodiments is illustrated in FIG. 5. The method in these embodiments comprises the steps of sending 510 a telephone number of a calling party to a called party, querying 530 a database to retrieve a computer-network address of a computer-network location containing information customized by the calling party, and sending 550 the computer-network address to a called party's CPE. This method can also include the step of automatically displaying 570 information customized by the calling party on the called party's CPE. Another preferred embodiment (illustrated in FIG. 6) comprises the steps of sending 610 a signal comprising a telephone number of a calling party to a called party and automatically displaying 630 information located on a computer network, and customized by the calling party, on the called party's CPE.

First Preferred Embodiment

The first preferred embodiment uses the network 200 having central offices equipped with AIN software.

Sending the Calling Party's Telephone Number

When a calling party 232 lifts the telephone receiver and dials the number of a called party 252, that number is sent to the calling party's 232 SSP 230. This SSP 230 sends, via STP 224, a network signaling protocol 260 to STP 244, which routes the signal 260 to the SSP 248 of the called party 252. The network signaling protocol 260 provides the calling party's 232 telephone number to the called party's 252 SSP 248, alerting it that the calling party 232 is attempting to terminate a call. Typically, the SSP 248 of the called party 252 has software with an associated computer processor and memory which recognizes the network signaling protocol 260 identifying an incoming call attempt. The called party's CPE 252 may also receive the calling party's 232 telephone number. It is important to note that other methods of sending the calling party's telephone number can be used.

Querying a Database to Retrieve the Calling Party's Network Address After the called party's 252 SSP 248 recognizes the network signaling protocol 260 as an incoming call attempt, the AIN software in the SSP 248 formulates and transmits a query to the SCP 242 via the STP 244. The query typically contains the ten-digit telephone number of calling party 232.

In response to the query, the SCP 242 determines what type of response is required by indexing the database 243 to learn what services are available to the CPE 252. Based on this determination, the SCP 242 indexes the database 243, as is well known in the art, to obtain and transmit the relevant information associated with the calling party's 232 telephone number. For example, the SCP 242 would learn that the called party 252 subscribes to the service described in these embodiments when it first indexes the database 243. The SCP would then obtain the calling party's 232 computer-network address (e.g., its URL) and transmit it to the SSP 248 for delivery to the called party's CPE 252.

Alternatively, the CPE can formulate and transmit a query to the SCP 242 via the STP 244. It is important to note that other methods of querying a database can be used and that the database can be local to the SCP, accessible over a connecting data network, or accessible remotely over a SS7 network.

Second Preferred Embodiment

The second preferred embodiment of this invention uses a network 300 with central offices that are not equipped with AIN Software.

Sending the Calling Party's Telephone Number

When the calling party 332 lifts the telephone receiver and dials the number of the called party 352, that number is sent to the corresponding central office, here central office 330. This central office 330 sends a network signaling protocol 360 to the STP 324, which routes it to the central office 348 of the called party 352 via STP 344. Typically, the central offices 328, 330, 348, 350 have software with an associated computer processor and memory which recognizes the network signaling protocol identifying an incoming call attempt. The network signaling protocol 360 provides the calling party's 332 telephone number to the called party's 352 central office 348 to alert it that the calling party 332 is attempting to terminate a call. The called party's CPE 352 may also receive the calling party's 332 telephone number. It is important to note that other methods of sending the calling party's telephone number can be used.

Querying a Database to Retrieve the Calling Party's Network Address

When the called party's 352 central office 348 attempts to terminate the call, the central office 348 determines, based on its switching configuration, which services the called party 352 subscribes to. This is unlike the network 200 having its central offices equipped with AIN software, in which the SCP determines the subscribed services. Based on this determination, the central office 348 transmits a query to the STP 344. In comparison to an AIN query, this query instructs the STP 344 to perform a specific task, here to retrieve the computer-network address (e.g., the URL) from the database 343. Typically, the query contains the ten-digit telephone number of calling party 332. The STP 344 indexes the calling party's 332 number into the database 343, as is well known in the art, and retrieves the associated computer-network address (e.g., the URL). Alternatively, the called party's CPE 352 can formulate and transmit a query to the STP 344.

Databases 482, 484, 486, 488 located off of the central offices 428, 430, 448, 450, instead of databases 323, 343 located off of the STPs 324, 344, can also be used (See FIG. 4). An application running in the called party's CPE 452 can signal an application running off a serving switch, such as an AIN service node/intelligent peripheral (SN/IP), to retrieve the computer-network address (e.g., the URL) from the database 482, 484, 486, 488. In this alternative, the intelligent peripheral, such as the AIN SN/IP, directly or indirectly attached to the central offices 428, 430, 448, 450, would transmit a query to the databases 482, 484, 486, 488.

It is important to note that other methods of querying a database can be used and that the database can be local, accessible over a connecting data network, or accessible remotely.

Third Preferred Embodiment

The third preferred embodiment of this invention follows the general method as described in the first two preferred embodiments but is not dependent upon a specific network 200, 300, 400.

Sending a Signal to the Called Party

Depending on the network 200, 300, 400 used, a SSP or a central office receives the calling party's number, as described in the first two embodiments above. When the SSP or the central office receives the number, it sends the number to the CPE. Other methods of sending the telephone number can be used.

Querying a Database to Retrieve the Calling Party's Network Address

In this embodiment, instead of using databases located within the phone network 200, 300, 400, a directory database, which contains computer-network addresses (e.g., URLs) referenced to phone numbers, accessible over the data line on a computer network (e.g., located on the Internet) is used. After receiving the phone number, the CPE runs an application that indexes the directory database to retrieve the computer-network address associated with the calling party's number.

Alternatively, the CPE application may have its own database of phone number/computer-network address conversions. This database can be manually updated, or it can be automatically updated by a remote application when, for example, the user places or receives a call.

In any of the above embodiments, an additional step may be performed of automatically displaying information customized by the calling party on a called party's CPE. Once the called party's CPE receives the computer-network address (e.g., the URL), an application in the CPE can retrieve and display the calling party-customized information located at the computer-network location specified by the computer-network address (e.g., the calling party's Web page), as is well known in the art.

Fourth Preferred Embodiment

In another embodiment, an application located in a computer network sends the calling-party-customized information directly to the CPE. This preferred embodiment (illustrated in FIG. 6) comprises the steps of sending 610 a signal comprising a telephone number of a calling party to a called party and automatically displaying 630 information located on a computer network on the called party's CPE.

Sending a Signal to the Called Party

Depending on the network 200, 300, 400 used, a SSP or a central office receives the calling party's number, as described in the first two embodiments above. When the SSP or the central office receives the number, it sends the number to the CPE. Other methods of sending the telephone number can be used.

Automatically Displaying Information Located on a Computer Network

When the CPE receives the calling party's telephone number, it sends the number to an application running in a computer network (e.g., the Internet). Instead of merely sending back the computer-network address of a location on the computer network containing the customized information, the application returns the customized information itself For example, instead of sending only the URL of the calling party, the calling party's Web page is sent directly to the called party's CPE, as is well known in the art.

Advantages

Integrating a computer network with a telephone service will add considerable value to CPE, whether in a household or a business environment. The embodiments described above provide an attractive way of linking businesses and customers and provide associated advantages to both the calling party and the called party.

When a business calls someone now, the customer may not pick up the call unless it is expected. Using any of the embodiments described above, the business can customize its information at its computer-network location (e.g., its Web page) to communicate an incentive to the customer to pick up the phone (e.g., "If you pick up this call in the next 10 seconds, you can win a big prize!"). This effectively allows businesses to send real-time messages to the people they are trying to reach.

Even if the customer does not or cannot answer the call, the business still communicates a message to its potential customer. This message can include an advertisement or a coupon. With its message delivered, the business would not need to phone back later even though no one answered the phone. From the customer's perspective, he or she can use the delivered page to shop or to access information about the business without having to return the call and directly deal with a sales person. In addition to communicating a message, the customized information (e.g., the Web page) can offer services to customers whose line is busy or who refuse to answer the call waiting signal (e.g., "I see you are on the phone, need a calculator? Here's one, along with our ad.").

After the call is answered, the customer can interact with the business's Web page, for example, in parallel with speaking. In this way, businesses can induce their customers into exploring more of the Web site, say, for advertising and shopping during the course of the conversation.

Alternatives

It is important to note that other telephone networks can be used. The methods described for sending the calling party's telephone number are just examples, and other methods can be used.

The databases shown in these embodiments can be Directory Assistance databases. The databases may be local to the phone network, accessible over a connecting data network, or accessible remotely, for example, over a SS7 network.

The number of elements and of regions in the above-described networks 200, 300, 400 were chosen for illustration purposes. In any given application, more or fewer elements or regions may be used. Also, in the embodiments described above, the calling party was chosen to be CPE 232, 332, 432, and the called party was chosen to be CPE 252, 352, 452. It should be noted that any CPE in either region can be the calling party or the called party.

Other means can be used to provide the called party with the calling party's telephone number.

The CPE can use any software or hardware application to perform the functions described in the embodiments. For example, Web browsing software, such as Netscape Navigator or Microsoft's Internet Explorer, may be used to retrieve the calling party's Web page. Alternatively, the CPE can use software designed to receive and display graphical information sent to it by an application running on a computer network, such as the Internet.

CPE includes, but is not limited to, (1) "thin clients" with a display and an application processor, such as smart telephones, (2) personal computers with a telephone and data network interface, (3) personal data assistants (PDAs), (4) cellular phones with data displays, and (5) Internet TV integrated with telephony. When a CPE comprises multiple devices (such as a computer and a telephone), an application in the network 200, 300, 400 can send the caller information to each device.

This invention does not depend on the use of any one particular CPE or CPE application. The CPE and CPE applications mentioned in the preferred embodiments are merely examples.

Asymmetric digital subscriber loop (ADSL) and integrated services digital network (ISDN) pipes work particularly well because of their speed, but other pipes can be used. Also, as mentioned earlier, any computer-network address can be used (a URL or another Internet location identifier is just an example). In addition, any calling-party-customized information at a computer-network location specified by the calling party's computer-network address can be retrieved, even if not in the form of a Web page.

As mentioned above, instead of a central office or SSP querying a database, an application running in the CPE can transmit the query to retrieve the computer-network address. In this alternative, the calling party's phone number would be sent to the CPE and would be used to query an STP, SCP, or intelligent peripheral, for example, to retrieve the calling party's computer-network address from a database. In another alternative, a CPE can query a database linked into the phone network.

One way in which indexing can be performed in the above preferred embodiments is by using the first six digits of the calling party's telephone number (the NPANXX combination). As noted above, other methods of indexing may be used.

The present embodiments may be implemented with software and logic as known to those of ordinary skill in the art. For example, the present embodiments may be written in a high level programming language such as Pascal, C, or C++. The present embodiments may be written and compiled to run on a standard UNIX operating system microcomputer implemented within the SCPs, the central offices, or the CPE.

It is intended that the foregoing detailed description be understood as an illustration of selected forms that the invention can take and not as a definition of the invention. It is only the following claims, including all equivalents, which are intended to define the scope of this invention.

What is claimed is:

1. A method for automatically sending customized information relating to a first party to customer premises equipment of a second party, the method comprising:

receiving a telephone number of the first party via the customer premises equipment of the second party;

initiating a telephone call between the first party and the second party in accordance with the telephone number of the first party;

prior to termination of the telephone call, querying a database and retrieving the customized information relating to the first party from said database; and sending the customized information of the first party to the customer premises equipment of the second party, for display by the customer premises equipment of the second party;

wherein the customized information relating to the first party pertains to an application operating via a computer network that includes the World Wide Web.

2. The method of claim 1, wherein the customer premises equipment includes a computer.

3. The method of claim 2, wherein the customized information relating to the first party includes web-related information.

4. The method of claim 2, wherein the computer runs a browser application.

5. The method of claim 2, wherein the computer operates software that receives and displays graphical information received via the computer network.

6. The method of claim 2, wherein the computer operates software that receives the customized information relating to the first party via the computer network and automatically displays the customized information relating to the first party information.

7. The method of claim 1, further comprising: sending a telephone number of the first party to the second party.

8. The method of claim 1, wherein the customer premises equipment runs a browser application and includes integrated telephony functionality.

9. The method of claim 1, wherein the telephone call is placed via a public switched telephone network.

10. The method of claim 1, wherein the telephone call is initiated by the first party.

11. The method according to claim 1, wherein said database and said customer premises equipment are separate.

12. A method for automatically sending customized information relating to a first party to customer premises equipment of a second party wherein the customer premises equipment runs a browser application and includes integrated telephony functionality, the method comprising:
   initiating a telephone call between the first party and the second party;
   in response to the initiation of the telephone call between the first party and the second party and prior to termination of the telephone call, querying a database and retrieving the customized information relating to the first party from said database; and
   sending the customized information of the first party to the customer premises equipment of the second party, for display by the customer premises equipment of the second party;
   wherein the customized information relating to the first party pertains to an application operating via the World Wide Web.

13. The method of claim 12, wherein the customer premises equipment includes a computer.

14. The method of claim 13, wherein the customized information relating to the first party includes web-related information.

15. The method of claim 13, wherein the computer runs a browser application.

16. The method of claim 13, wherein the computer operates software that receives and displays graphical information received via the computer network.

17. The method of claim 13, wherein the computer operates software that receives the customized information relating to the first party via the computer network and automatically displays the customized information relating to the first party information.

18. The method of claim 12, further comprising:
   sending a telephone number of the first party to the second party.

19. The method of claim 12, further comprising:
   receiving a telephone number of the first party via customer premises equipment of the second party.

20. An apparatus for automatically sending customized information relating to a first party to customer premises equipment of a second party, the apparatus comprising:
   customer premises equipment for a first party,
   customer premises equipment for a second part,
   a database, and
   a service control point,
   wherein customer premises information of the second party is configured to receive a telephone number of the first party;
   the customer premises equipment of the first party is configured to initiate a telephone call to the customer premises equipment of the second party;
   the service control point is configured to retrieve the customized information relating to the first party from said database; and
   the service control point is configured to send the customized information of the first party to the customer premises equipment of the second party, for display by the customer premises equipment of the second party; and
   wherein the customized information relating to the first party pertains to an application operating via a computer network that includes the World Wide Web.

* * * * *